(No Model.)
A. HAID.
SECONDARY BATTERY.
No. 294,465. Patented Mar. 4, 1884.
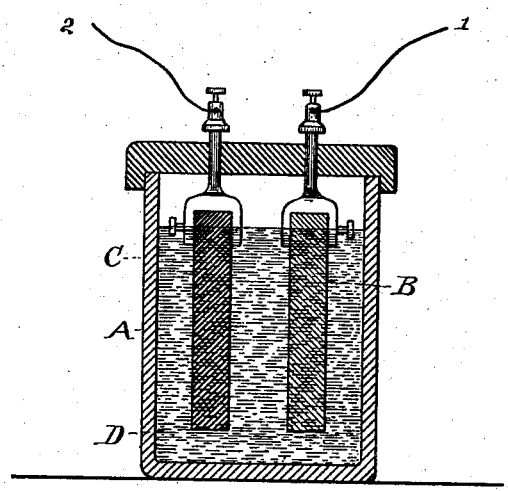
ATTEST:
E. C. Rowland
H. W. Seely
INVENTOR:
Alfred Haid,
By Rich. N. Dyer,
Atty.

UNITED STATES PATENT OFFICE.

ALFRED HAID, OF RAHWAY, ASSIGNOR, BY DIRECT AND MESNE ASSIGN-
MENTS, TO HAIDS ELECTRICAL STORAGE COMPANY, OF NEWARK,
NEW JERSEY.

SECONDARY BATTERY.

SPECIFICATION forming part of Letters Patent No. 294,465, dated March 4, 1884.

Application filed March 21, 1883. (No model.)

*To all whom it may concern:*

Be it known that I, ALFRED HAID, a subject of the Emperor of Germany, and a resident of Rahway, in the county of Union and State of New Jersey, have invented certain new and useful Improvements in Secondary Batteries, of which the following is a specification.

My invention relates to secondary batteries in which one or both of the electrodes is a plate of lead.

The invention consists in a novel method of treating or preparing the said lead plate or plates, whereby they are better adapted for use, and produced in a condition in which they are more certain to be affected in the desired manner by the action of the charging-current.

In batteries of the Planté and similar types it has been found that the lead plates used often refuse to take a charge, or, in other words, the current, when passed through a cell, fails to oxidize the positive plate, this being apparently due to a peculiar condition of its surface. My object is to avoid this by treating the plates preparatory to submitting them to the action of the charging-current, so that they shall present a surface upon which the peroxide readily forms. I accomplish this by coating the lead plates with zinc and then dissolving off the zinc. This process, I have found, leaves the surface of the plates in a pure metallic condition and well adapted for receiving the coating of peroxide, this being probably caused by local galvanic action between the zinc and the surface of the lead plates, which are always found to have more or less of low oxide of lead upon them.

In the accompanying drawing I have shown a battery to which my invention is applied. In this battery I employ in a cell, A, a plate, B, of amalgamated zinc or cadmium, and a plate, C, of lead. For the liquid I use a dilute solution of sulphuric acid and sulphate of zinc, (designated by the letter D.) The lead plate, before being placed in the jar, is electrically coated with zinc; or this may be done in the battery itself, if so desired. To charge the battery, the current is passed from the lead to the zinc plate. This dissolves the zinc coating from the lead plate, leaving the surface of the latter in a condition in which it readily takes the coating of peroxide that is formed by the subsequent action of the current. Metallic zinc is in the meantime deposited upon the other plate, leaving sulphuric acid in the solution, and bringing the battery into a condition in which it is capable of developing a current. If the lead plate, with its coating of zinc, be allowed to stand in the battery or in an acid solution, the zinc is dissolved off with the same results as those effected by electrical action. Plates prepared in this manner are applicable to any forms of battery of the Planté or similar type; and it is obvious that the zinc element and the solution which I employ in the battery may be replaced by any others that are well known as equivalents.

What I therefore claim as my invention is—

1. The method of preparing lead plates for secondary batteries, which consists in coating them with zinc, and then dissolving said coating prior to forming the plates by the action of a current, as described.

2. The method of preparing lead plates for secondary batteries, which consists in coating them by an electric current with zinc, and then removing such coating by reversing the current, substantially as set forth.

This specification signed and witnessed this 8th day of March, 1883.

ALFRED HAID.

Witnesses:
H. W. SEELY,
EDWARD H. PYATT.